United States Patent
Ansley

(10) Patent No.: US 7,072,365 B1
(45) Date of Patent: Jul. 4, 2006

(54) SYSTEM AND METHOD FOR MULTIPLEXING BROADBAND SIGNALS

(75) Inventor: Carol J. Ansley, Dawsonville, GA (US)

(73) Assignee: ARRIS Interactive, LLC, Suwanee, GA (US)

( * ) Notice: Subject to any disclaimer, the term of this patent is extended or adjusted under 35 U.S.C. 154(b) by 815 days.

(21) Appl. No.: 09/750,306

(22) Filed: Dec. 29, 2000

(51) Int. Cl.
H04J 3/04 (2006.01)
H04J 3/02 (2006.01)
H04J 11/00 (2006.01)
H04J 14/00 (2006.01)

(52) U.S. Cl. .................. 370/535; 370/538; 398/48

(58) Field of Classification Search ........ 370/535–538, 370/390–392, 410, 352, 230, 401, 360, 241, 370/487, 325, 210, 397, 396, 404, 395, 441, 370/485, 280; 709/240, 225–228, 250, 236–238; 725/129, 73, 81, 106, 116; 398/9, 48, 57, 398/63, 79, 152; 455/418, 84, 422.1, 3, 561, 455/194.2, 202, 114.3, 293; 359/110–167, 359/56.2; 348/473; 379/56.2, 399.01; 375/222, 375/295, 357, 211, 220, 229, 231, 109, 106
See application file for complete search history.

(56) References Cited

U.S. PATENT DOCUMENTS

| 3,794,768 | A | * | 2/1974 | Carney et al. ............... 370/538 |
| 4,831,619 | A | * | 5/1989 | Rosen ......................... 370/325 |
| 4,879,711 | A | * | 11/1989 | Rosen ......................... 370/325 |
| 5,442,472 | A | * | 8/1995 | Skrobko ........................ 398/9 |
| 5,581,555 | A | * | 12/1996 | Dubberly et al. ............ 370/487 |
| 5,708,961 | A | * | 1/1998 | Hylton et al. .................. 725/81 |
| 5,784,683 | A | * | 7/1998 | Sistanizadeh et al. ......... 725/73 |
| 5,790,523 | A | * | 8/1998 | Ritchie et al. ............... 370/241 |
| 5,802,173 | A | * | 9/1998 | Hamilton-Piercy et al. ......................... 379/56.2 |
| 5,809,395 | A | * | 9/1998 | Hamilton-Piercy et al. . 725/106 |
| 5,930,231 | A | * | 7/1999 | Miller et al. ................. 370/210 |
| 6,072,994 | A | * | 6/2000 | Phillips et al. ................. 455/84 |
| 6,137,793 | A | * | 10/2000 | Gorman et al. ............. 370/360 |
| 6,490,727 | B1 | * | 12/2002 | Nazarathy et al. .......... 725/129 |
| 6,577,414 | B1 | * | 6/2003 | Feldman et al. ............ 725/129 |
| 6,615,039 | B1 | * | 9/2003 | Eldering ..................... 455/418 |
| 6,937,721 | B1 | * | 8/2005 | Koban ................... 379/399.01 |
| 2002/0108199 | A1 | * | 8/2002 | Mao et al. ................... 725/109 |

* cited by examiner

Primary Examiner—Chi Pham
Assistant Examiner—Prenell Jones

(57) ABSTRACT

A frequency agile cable modem termination system which is configured to receive cable TV or other broadband signals on a frequency allocated basis. Cable TV headend may receive cable TV modem or other signals via optical/electrical converters and other links, and route those signals through a frequency multiplexer to divide individual feeds into separated frequency slots. The cable modem termination system may then have receivers tuned to individual slots allocated to data feeds, such as Internet, video, telephony or other sources, and route those sources over the Internet. Upon a failure condition within any given receiver or other component, a backup cable modem termination system, connected to the same common bus as the main or active system, may be rapidly activated by having backup receivers contained in that unit tuned to appropriate frequencies to pick up the signals within the corresponding band. Reliability and robustness is increased, and cabling requirements are decreased.

1 Claim, 5 Drawing Sheets

SYSTEM AND METHOD FOR MULTIPLEXING BROADBAND SIGNALS

FIELD OF THE INVENTION

The invention relates to the field of communications, and more particularly to an advanced multiplexer for collection of multiple broadband signals in a cable television headend or other communications facility.

BACKGROUND OF THE INVENTION

The increasing demand for data and other services over the Internet and other networks has placed increasing demands on network access nodes, such as Internet service providers (ISPs) and other signal transfer points. One type of emerging data facility is broadband Internet over cable modems. Networks servicing broadband cable links may include both coaxial copper links as well as optical fiber connections, typically interfaced using optical/electrical or electrical/optical (O/E or E/O) converters. In recent times, the relatively high bandwidth offered by coaxial cable or hybrid fiber/cable networks has permitted the delivery of traditional Internet, telephony, video and other services at data rates of up to one Megabit/sec and more, making such facilities attractive for consumers, businesses and others with more intensive data needs.

When access to the Internet or other networks is provided by way of a cable modem site, the intake feeds from fiber, cable or other links is often terminated in a cable modem termination system (CMTS), as for instance illustrated in FIG. 1. The CMTS may contain a set of radio frequency (RF) receivers to which individual data feeds may be routed for decoding. However, CMTS equipment such as that installed in cable TV, headend or other network facilities may on occasion fail.

To protect against that case, a CMTS 102 as illustrated in FIG. 1 may be connected to a backup CMTS 106, via a switch 104. The switch 104 may be configured to monitor the CMTS 102 to detect power failures, software faults or other fault conditions and transfer the delivery of incoming RF or other signal to the backup CMTS 106, so that subscribers to Internet service, video service, telephony or other data services may be diverted through the backup equipment to the Internet or other network without substantial interruption.

However, in commercial practice the switch 104 has been implemented as a mechanical switch or relay, whose dependability may itself not be guaranteed. Therefore, in conventional failover mechanisms in cable modem installations, it is possible for data customers to experience complete access failure and significant network downtime.

Moreover, as illustrated in FIG. 2, the network wiring for broadband deployment in cable TV headends can become complicated, cumbersome and expensive. In a cable TV node as illustrated in FIG. 2, individual households or other sites having a cable TV, modem or other broadband access device may each feed and receive signals to and from an optical/electrical converter 110, such as homes in a neighborhood or businesses on a campus or street. The optical/electrical converter 110 may translate the signals from optical to electrical format as appropriate, and communicate those signals to a cable TV headend 108, directly or via a block converter 112, splitter or other resources.

A block converter 112 may aggregate multiple customer data links on to one backbone communications link for delivery to a cable TV headend 108. The block converter 112 may do so by allocating frequencies within a frequency space to each of the customer data signals, and therefore make efficient use of available physical plant and bandwidth to the cable TV headend 108.

After receipt by one or more optical/electrical converter 110, the signals may be delivered to individual RF receivers within the CMTS 102. However, and as illustrated in FIG. 2, each of the one or more optical/electrical converter 110 must feed a corresponding receiver, meaning that within the cable TV headend 108 a large number of cables are required to mate cables and receivers, any of which could fail, become shorted or otherwise malfunction. Significant heat may be generated from the wiring nest, and repair may be difficult since functioning wires must not be disturbed.

In addition, in this type of conventional cable TV headend 108, the CMTS may be backed up by a backup CMTS 106 via switch 104, which again is implemented as a relay or other mechanical switching fabric prone to mechanical disturbance, and which requires some amount of time to effect the switching action. Reliability, convenience, installation footprint and other aspects of the broadband facility could be enhanced by more advanced headend equipment. Other problems exist.

SUMMARY OF THE INVENTION

The invention overcoming these and other problems in the art relates to a system and method for multiplexing broadband signals, in which the CMTS of a cable TV headend or other broadband facility is fed not directly by optical/electrical or electrical optical converters, but by a multiplexer module which distributes the incoming data signals through an assigned frequency space over a single cable, fiber or other connection to the terminal. Receivers within the CMTS may be made frequency agile or selectable, so that individual receivers may tune to appropriate frequency slots to receive signals from corresponding homes, businesses or other data consumers on demand.

Moreover, the frequency selectable CMTS which may be deployed according to the invention may be backed up by a another frequency selectable CMTS acting as a backup unit, connected to the same bus as the main CMTS to the multiplexer module. Upon failure or malfunction of any individual receiver or of the entire active CMTS, failover may therefore be accomplished on a very rapid basis by tuning the backup frequency selectable CMTS to appropriate frequency channels driving on the bus to which both receivers are mutually connected. Reliability is enhanced, and the wiring matrix of a cable TV headend or other facility is simplified.

BRIEF DESCRIPTION OF THE DRAWINGS

The invention will be described with respect to the accompanying drawings, in which like elements are referenced with like numerals.

DETAILED DESCRIPTION OF THE PREFERRED EMBODIMENTS

Figure 1:
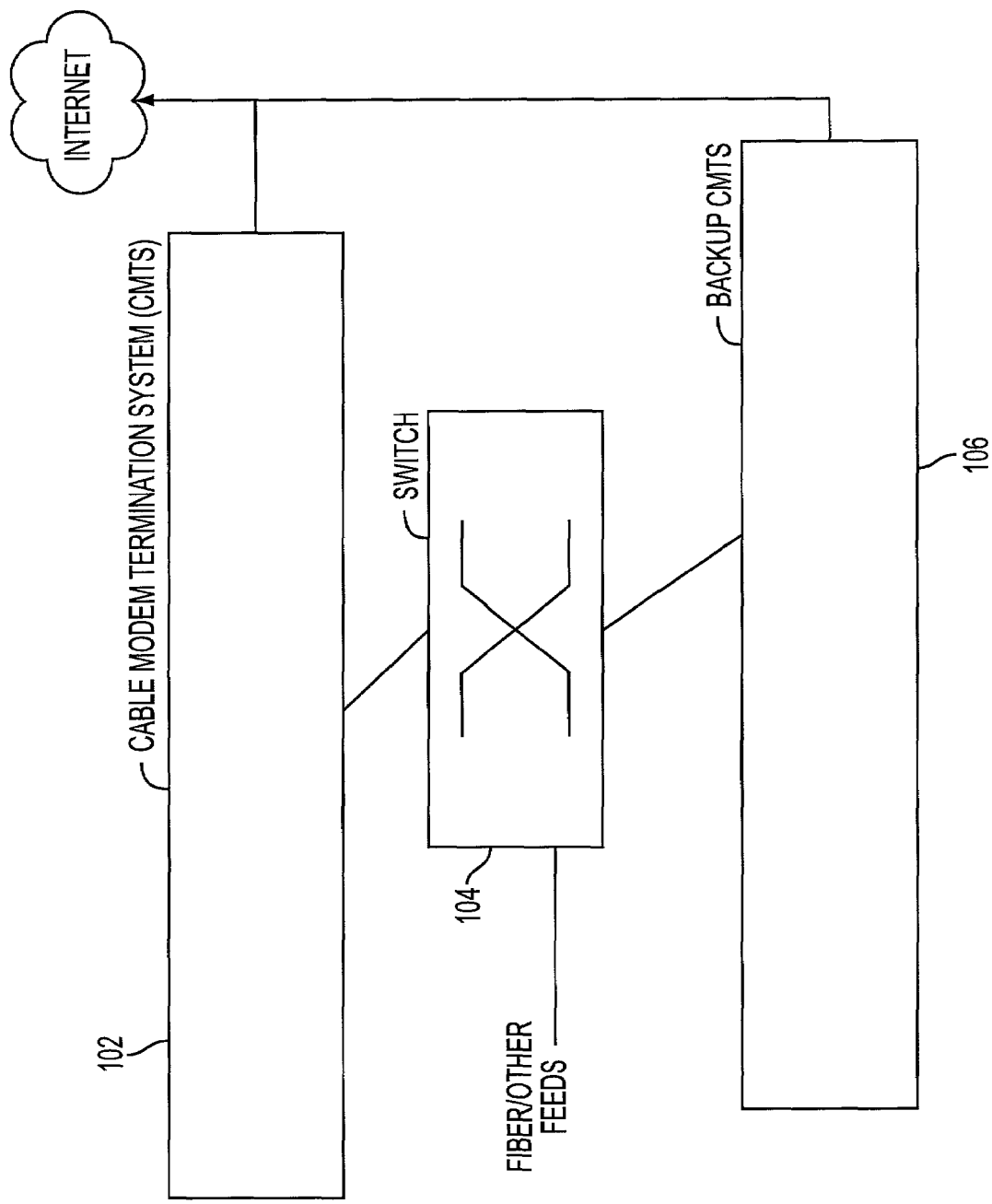
FIG. 1 illustrates a cable modem termination system (CMTS) connected to a backup cable modem termination system in a conventional implementation.
Figure 2:
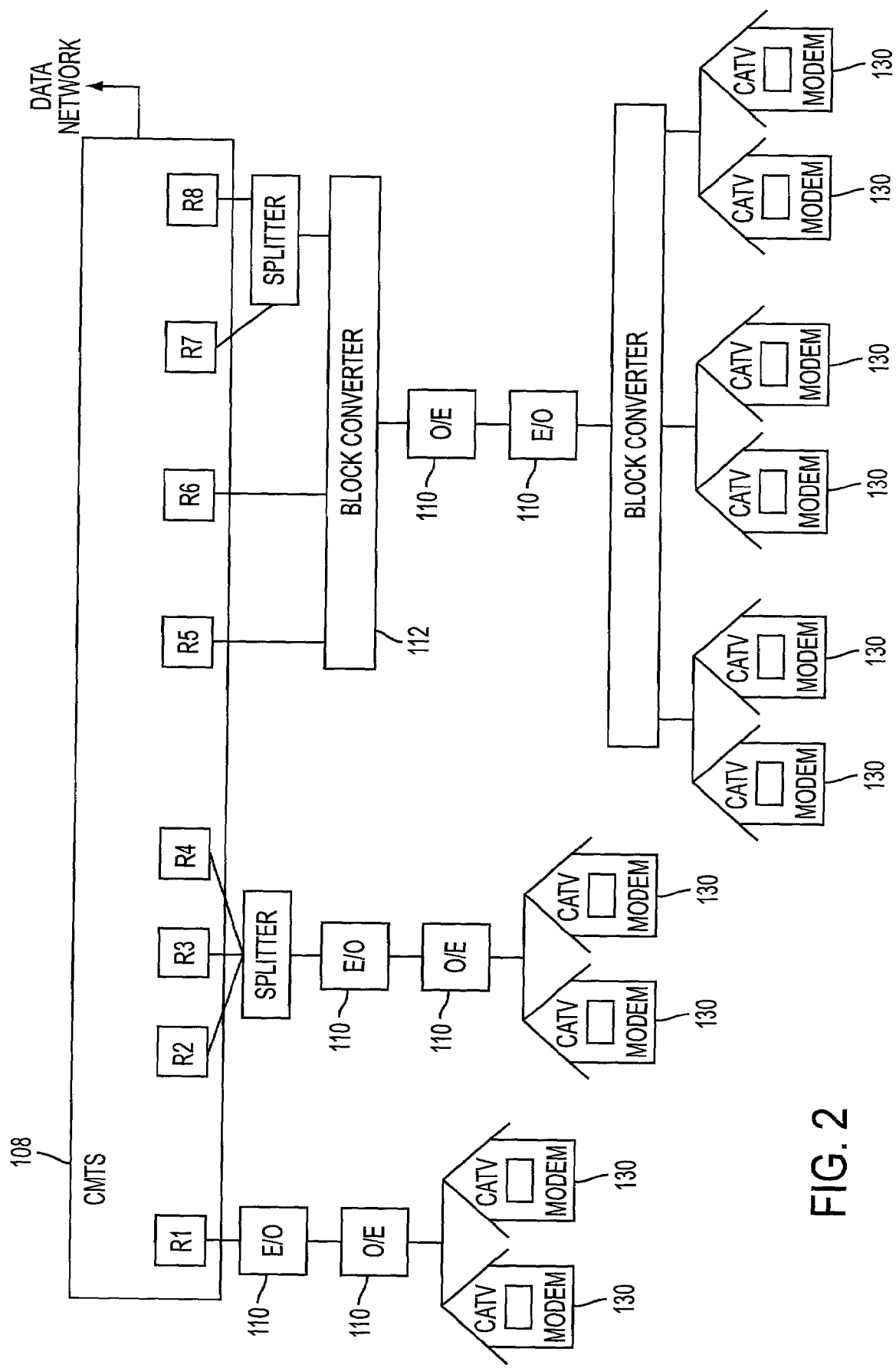
FIG. 2 illustrates a broadband network implemented to connect cable TV modems to a cable TV headend according to a conventional implementation.
Figure 3:
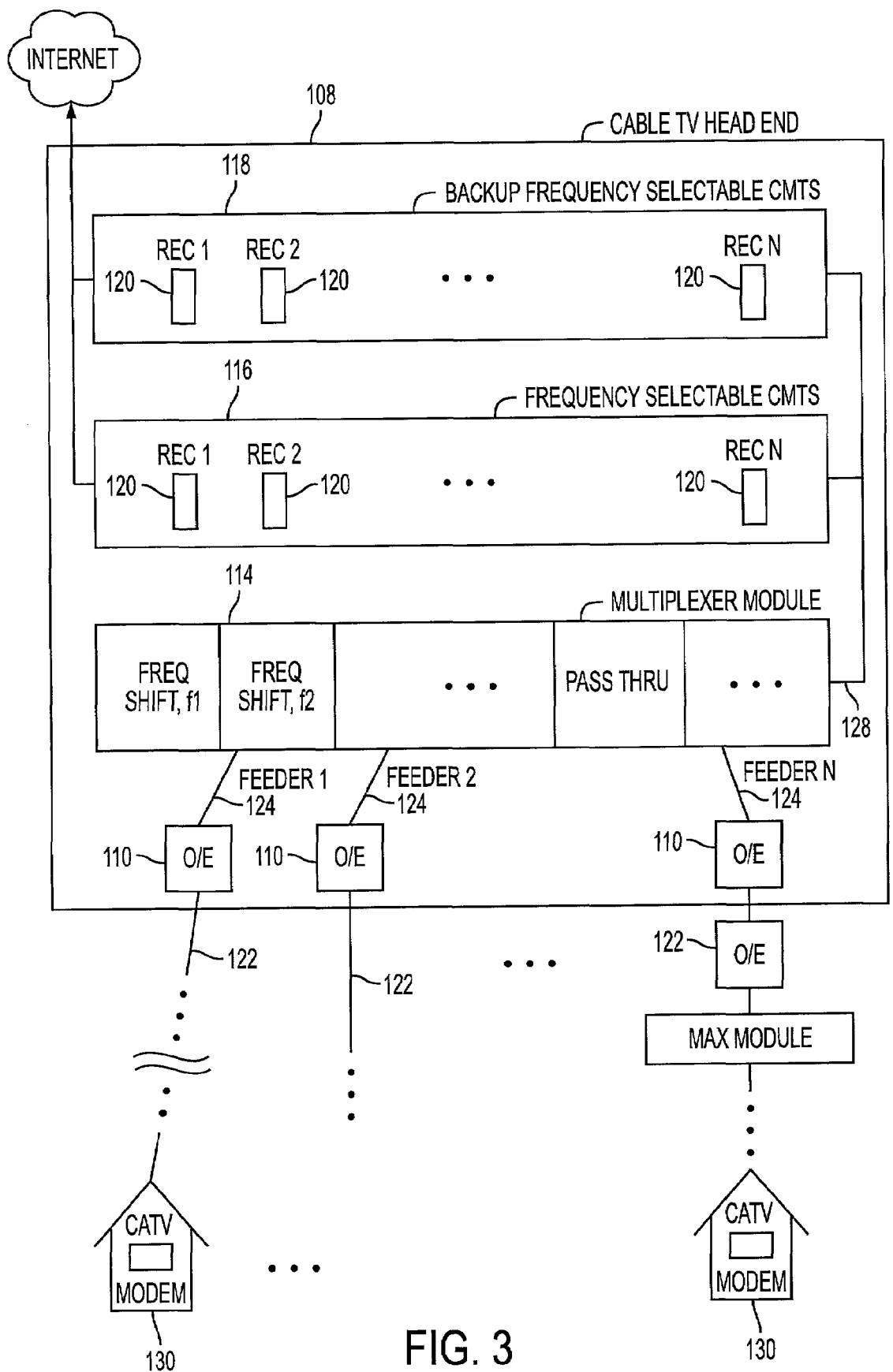
FIG. 3 illustrates a cable TV headend and associated components according to one embodiment of the invention.

As shown in FIG. 3, in an illustrative network architecture implemented according to an embodiment of the invention, one or more customers 126 using broadband access devices 130 such as a cable TV modem or other device may be connected to a cable TV headend 108 via a communications link 122. The communications link 122 may connect to intermediate resources such as optical/electrical converters 110, block converters or other communications hardware, logic or control on the network edge and out to neighborhoods and other local access points. The communications link 122 may connect to additional optical/electrical converters 110 installed within the cable TV headend 108, to receive individual or aggregated broadband signals from consumers, businesses or other customers. (In this description, for convenience of reference optical/electrical converters 110 will be understood to refer to and may be illustrated as electrical/optical converters as appropriate as well, depending on network implementations and orientation of inputs and outputs).

In a cable TV headend 108 according to an embodiment of the invention, the set of optical/electrical converters 110 within the facility may be connected to a multiplexer module 114 via connections 124. Each of the connections 124 may connect a corresponding optical/electrical converter 110 to the multiplexer module 114. Each of the connections 124 may therefore deliver the signals traveling over corresponding fibers (fiber 1, fiber 2, . . . fiber N) originating from corresponding clients, such as home users or business users browsing or other Internet commands, video, telephone or other signals.

Figure 4:
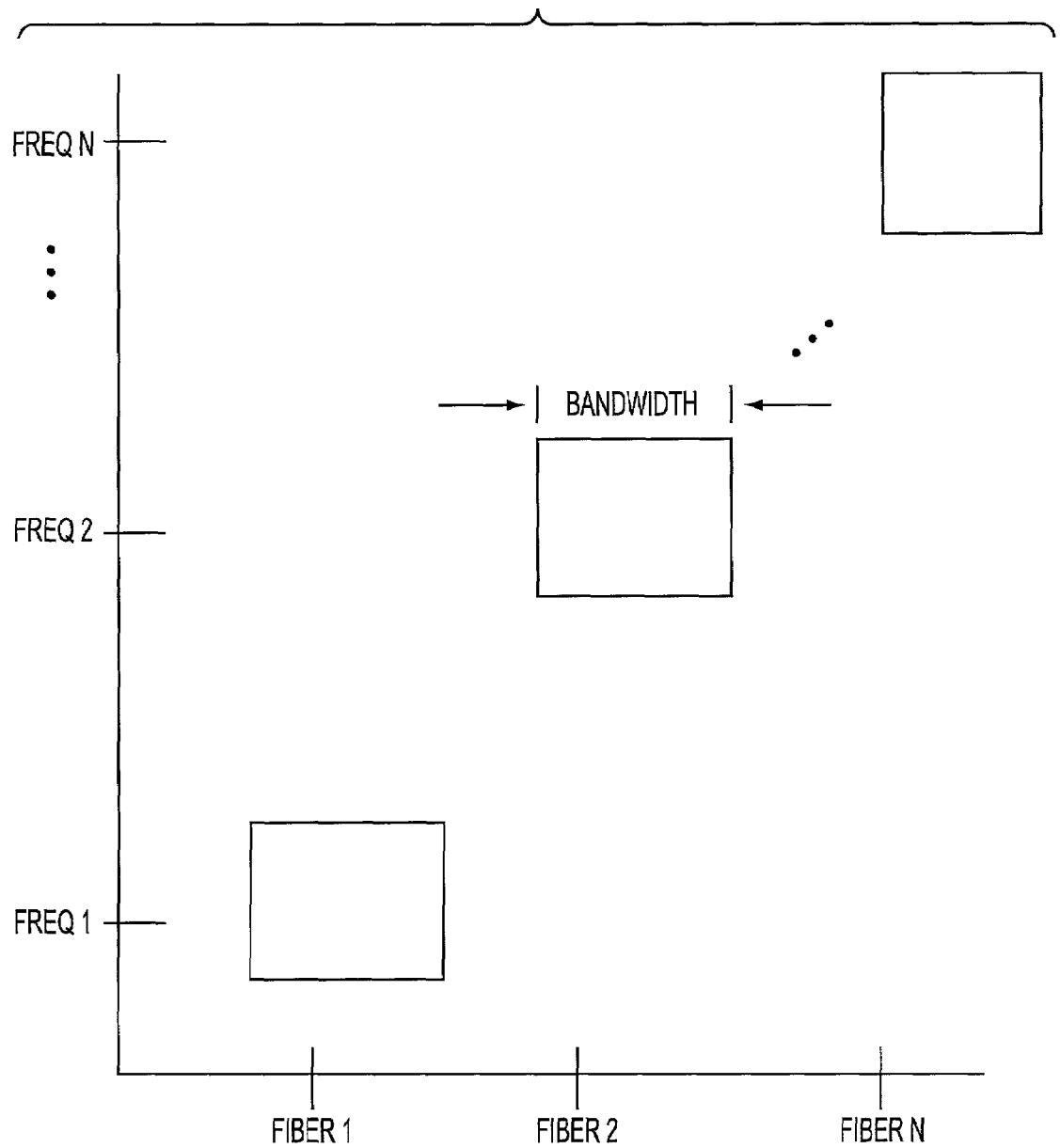
FIG. 4 illustrates a frequency division multiplexing arrangement according to an embodiment of the invention.

The multiplexer module 114 may receive the signals arriving from the optical/electrical converters 110 and modulate those signals into defined frequency ranges for multiplexing over bus 128. A schematic representation of the multiplexing arrangement of the multiplexer module 114 is illustrated in FIG. 4, in which the signal or composite signals delivered over Fiber 1 may be allocated to an associated frequency 1 having a defined bandwidth, such as a 50 MHz wide band centered at 200 MHz on carrier. The signal or composite signals arriving on Fiber 2 may be allocated to Frequency 2, and so forth through Fiber N, such that the data traffic arriving in parallel in the optical/electrical converters 110 of the cable TV headend 108 may be divided into distinct, mutually exclusive frequency ranges for delivery on to the bus 128. In other implementations, the multiplexer module 114 may be deployed in other network positions, for instance outside the cable TV head end 108 with a passthrough connection to the frequency selectable CMTS 116.

In this illustrated embodiment of the invention, a frequency selectable CMTS 116 may be connected to bus 128. The frequency selectable CMTS 116 includes a set of receivers 120, each of which may be tuned to corresponding frequency ranges to which individual fiber or other feeds have been allocated as illustrated in FIG. 4. In one embodiment, one or more individual receivers in receivers 120 may be implemented as cards, backplanes or other removable modules for installation into the frequency selectable CMTS 116. Thus in this embodiment, each of receivers 120 (REC 1, REC 2 . . . REC N) is continuously attached to the bus 128 and tuned to its assigned frequency spot, effectuating a frequency division multiplexing of the source broadband signals. Compared to certain prior art implementations, the multiple wiring connections, harnesses and cages may be reduced to the single connection via bus 128. Bus 128 may be implemented as a fiberoptic, coaxial cable, backplane or other type of electrical, optical or other connection.

The invention in this respect permits for rapid, reliable failover protection against faulty receivers or the entire frequency selectable CMTS 116. As illustrated in FIG. 3, a backup frequency selectable CMTS 118 may be connected to the bus 128 simultaneously with the frequency selectable CMTS 116. The backup frequency selectable CMTS 118 may contain a set of receivers 120 in one-to-one correspondence with the active receivers within the frequency selectable CMTS 116, or in other mapping relationships. Upon the occurrence of a power, software, circuitry or other fault in any one or more of the receivers 120 installed within the active frequency selectable CMTS 116 or the frequency selectable CMTS 116 itself, failover switching may be accomplished by logic control to cause the corresponding receiver 120 or entire set of receivers located in backup frequency selectable CMTS 118 to tune to the frequency slot of the blocks, fiber or other feed.

Individual receivers 120 within the backup frequency selectable CMTS 118 may be assigned to fixed frequencies corresponding to active receivers within the active frequency selectable CMTS 116, or may be switched on the fly according to failure, restoration and other conditions. Moreover, receivers 120 within the frequency selectable CMTS 116 may be allocated and reallocated to different frequency slots on the fly according to changing network demands, configurations and other network needs. The receivers 120 installed within the frequency selectable CMTS modules within a cable TV headend 108 according to the invention must therefore be configured to be frequency selectable or frequency agile, meaning that individual receivers 120 may be programmed under logic or other control to change the frequency to which they listen on a spontaneous basis. The frequency reallocation may be accomplished by programmed logic within each backup frequency selectable CMTS 118 and frequency selectable CMTS 116, by remote connection via web interface, telemetric or other local or remote control.

Because the switching action to a backup receiver according to the invention does not depend upon mechanical components and because the backup frequency selectable CMTS 118 may be constantly connected to the same bus 128 as the active frequency selectable CMTS 116, the failover action may be both more reliable, robust and faster than with mechanical and other implementations. Cabling and power requirements may also be decreased.

Figure 5:
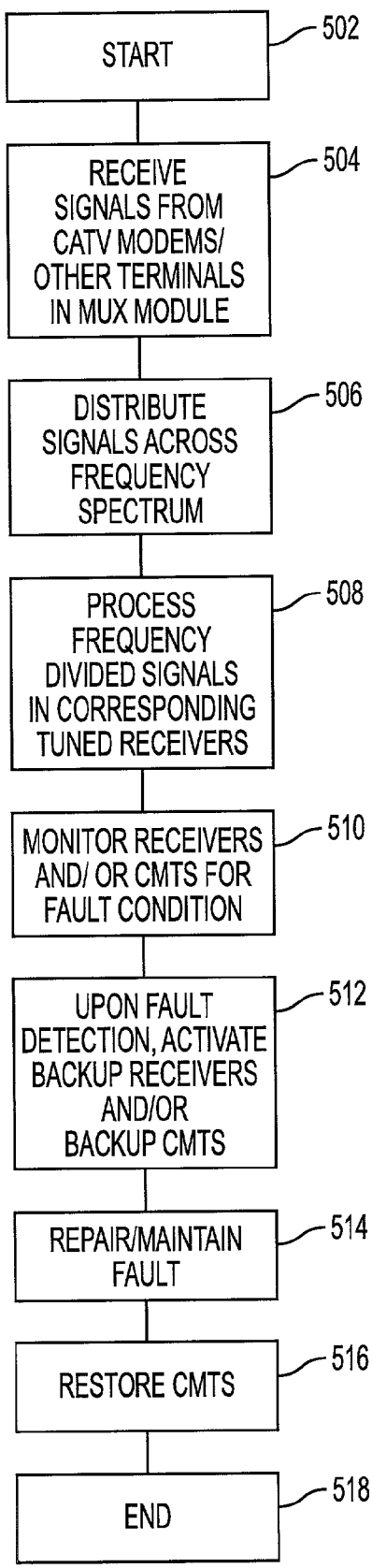
FIG. 5 illustrates a flowchart of processing of broadband signals according to the invention.

A flowchart for broadband signal processing according to an embodiment of the invention is illustrated in FIG. 5. In step 502, processing begins. In step 504, signals may be received from cable TV modems or other broadband or other terminals in the multiplexer module 114. In step 506, the multiplexer module 114 may distribute the broadband signals across allocated frequency spectra, such as for instance assigning individual broadband feeds to separated 50 MHz slots. In step 508, the arriving data signals which have been divided in frequency may be processed in corresponding ones of the tuned receivers 120. In step 510, the receivers 120 and/or the frequency selectable CMTS 116 may be monitored for any type of fault condition.

In step 512, upon detection of a fault within a given receiver 120 or the frequency selectable CMTS 116 itself, backup receivers 120 within the backup frequency selectable CMTS 118 or the entire backup frequency selectable CMTS 118 may be activated and substituted for the faulty receiver or CMTS via frequency tuning to common bus 128. In step 514, the fault condition causing the switchover may be examined to repair the fault or maintain the service. In step 516, the action of the frequency selectable CMTS 116 may be restored as appropriate to reset the fault condition.

The foregoing description of the frequency selectable multiplexer architecture according to the invention is illustrative, and variations in implementation and configuration will occur to persons skilled in the art. For instance, while generally described as containing a single multiplexer module 114, a given implementation of the cable TV headend 108 could contain multiple multiplexer modules, acting singly or in combination. Similarly, although 50 MHz frequency allocations were illustratively mentioned, an array of other bands and allocations are possible. The scope of the invention is accordingly intended to be limited by the following claims.

What is claimed is:

1. A system for processing signals, comprising:

a multiplexer, the multiplexer having a first interface to a plurality of broadband signal inputs and a second interface to a bus, the multiplexer multiplexing signals received at each of the broadband signal inputs onto the bus according to a frequency allocation scheme that associates each of the broadband signal inputs with an assigned frequency block;

a plurality of receivers in communication with the bus for receiving and decoding the multiplexed broadband signal inputs for communication with a data network; wherein each of the receivers is tunable to a frequency corresponding to a frequency block of the frequency allocation scheme;

wherein at least one of the receivers is a backup receiver capable of being activated by an activation control signal that is generated upon detection of a fault condition; and wherein activation of a backup receiver comprises tuning the backup receiver to a frequency corresponding to a failed receiver.

* * * * *